United States Patent [19]

Yamaya et al.

[11] Patent Number: 4,960,852

[45] Date of Patent: Oct. 2, 1990

[54] THERMOSETTING RESIN COMPOSTION FROM BIS, MALEIMIDE AND BIS (META-AMINO PHENOXY) COMPOUND

[75] Inventors: Norimasa Yamaya; Nobuhito Koga; Masahiro Ohta, all of Yokohama; Akihiro Yamaguchi, Kamakura, all of Japan

[73] Assignee: Mitsui Toatsu Chemicals, Inc., Tokyo, Japan

[21] Appl. No.: 304,558

[22] Filed: Feb. 1, 1989

Related U.S. Application Data

[62] Division of Ser. No. 71,161, Jul. 8, 1987, Pat. No. 4,831,102.

[30] Foreign Application Priority Data

Jul. 15, 1986 [JP] Japan ................................ 61-164668
Aug. 15, 1986 [JP] Japan ................................ 61-190563
Aug. 15, 1986 [JP] Japan ................................ 61-190564

[51] Int. Cl.$^5$ ............................................. C08G 73/10
[52] U.S. Cl. ................................... 528/170; 528/125; 528/128; 528/220; 528/229; 528/321; 528/322
[58] Field of Search ............... 528/170, 125, 128, 220, 528/229, 322, 321

[56] References Cited

U.S. PATENT DOCUMENTS

| | | | |
|---|---|---|---|
| Re. 29,316 | 7/1977 | Bargain et al. | 260/30.2 |
| 3,562,223 | 2/1971 | Bargain et al. | 260/30.2 |
| 3,658,764 | 4/1972 | Bargain et al. | 260/30.2 |
| 3,669,930 | 6/1972 | Hara et al. | 528/170 |
| 4,076,697 | 2/1978 | Forgo et al. | 260/78 |
| 4,390,596 | 6/1983 | Laurent | 428/473.5 |
| 4,435,560 | 3/1984 | Takahashi et al. | 528/170 |
| 4,526,838 | 7/1985 | Fujioka et al. | 428/458 |
| 4,598,115 | 7/1986 | Fujioka et al. | 524/376 |
| 4,831,102 | 5/1989 | Yamaya et al. | 528/170 |

FOREIGN PATENT DOCUMENTS

| | | |
|---|---|---|
| 0192480 | 8/1986 | European Pat. Off. . |
| 0233435 | 8/1987 | European Pat. Off. . |
| 59560 | 3/1985 | Japan . |
| 61-221158 | 10/1986 | Japan . |

*Primary Examiner*—Harold D. Anderson
*Attorney, Agent, or Firm*—Fisher, Christen & Sabol

[57] ABSTRACT

Thermosetting resin compositions are provided which comprise aromatic bismaleimide derivatives, for example, 2,2-bis[4(3-maleimidephenoxy)phenyl]propane and diamine derivatives, for example, 4,4'-bis(3-aminophenoxy)biphenyl. Prepolymers are also prepared by conducting heat-treatment of said compositions. The compositions of this invention are used for thermoforming such as compression molding etc. as well as raw materials of adhesives and coatings. The compositions provide molded articles which are excellent, for example, impact strength, flexibility and high-temperature stability.

3 Claims, No Drawings

THERMOSETTING RESIN COMPOSTION FROM BIS, MALEIMIDE AND BIS (META-AMINO PHENOXY) COMPOUND

This application is a continuation of U.S. application Ser. No. 171,161, filed July 8, 1987 now U.S. Pat. No. 4,831,102.

BACKGROUND OF THE INVENTION (a) Field of the Invention

The present invention relates to novel thermosetting resin compositions which are excellent in impact strength and flexibility. More particularly, it relates to thermosetting resin compositions and their prepolymers having aromatic bismaleimide derivatives and diamine derivatives as structural units.

(b) Description of the Prior Art

Conventional thermosetting resins having imide structure have been widely used in industry due to their excellent properties such as electrical insulation, high-temperature stability and dimensional stability of molded articles.

The thermosetting resins, however, obtained by using aromatic bismaleimides as polymerization ingredients are insoluble and infusible, and have exhibited drawbacks of poor impact strength and flexibility, though these materials are excellent in the high-temperature stability. Therefore, as a method for improving the impact strength and flexibility of the aromatic bismaleimide resins, aromatic bismaleimides were tried to use in combination with aromatic diamines. For example, polyamino-bismaleimide resin which is composed of N,N'-(4,4'-methylenediphenylene)bismaleimide and 4,4'-diamino-diphenylmethane (trade mark KERIMID, a product from Rhône-Pulenc Ind.) has superior impact strength and flexibility to the homopolymers of aromatic bismaleimide. Therefore the resin is used for impregnation varnish, laminated boards, molded articles, etc.

The above thermosetting resins, however, have been still unsatisfactory in the impact strength and flexibility view point.

SUMMARY OF THE INVENTION

The object of this invention is to provide a tough thermosetting resin which maintains traditional high-temperature stability and is also excellent in the impact strength and flexibility.

The object is achieved by providing the following thermosetting resin.

That is, the present invention is a thermosetting resin composition which comprises a bismaleimide derivative having the formula (I):

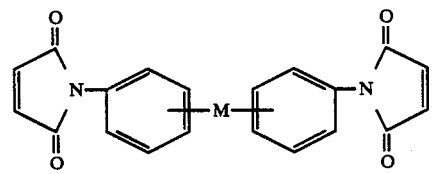

(I)

wherein M is methylene or —O—R—O—, where R is a divalent radical represented by

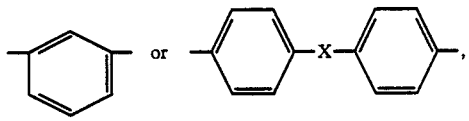

where X is a radical selected from the group consisting of a bond, a divalent hydrocarbon radical having 1 to 10 carbon atoms, hexafluorinated isopropyridene radical, carbonyl radical, thio radical, sulfinyl radical, sulfonyl radical and oxide, and wherein nitrogen atom is para-located to methylene when M is methylene or meta-located to ether linkage when M is —O—R—O—, and a diamine derivative having the formula (II):

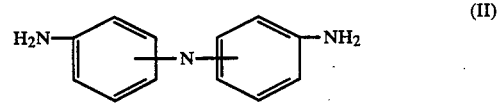

(II)

wherein N is methylene or —O—R—O—, where R is a divalent radical represented by

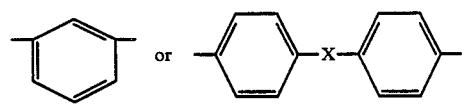

where X is a radical selected from the group consisting of a bond, a divalent hydrocarbon radical having 1 to 10 carbon atoms, hexafluorinated isopropylidene radical, carbonyl radical, thio radical, sulfinyl radical, sulfonyl radical and oxide, and wherein nitrogen atom is para-located to methylene when N is methylene or meta-located to ether linkage when N is —O—R—O— (excluding the combination of the bismaleimide derivative when M is methylene with the diamine derivative when N is methylene).

The thermosetting resin composition is prepared by the combination of the bismaleimide derivatives of the formula (I) having the divalent radical wherein R is represented by

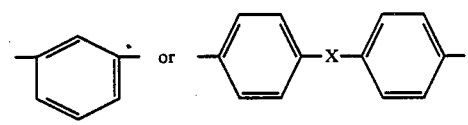

with the diamine derivatives of the formula (II) having the divalent radical wherein R is represented by

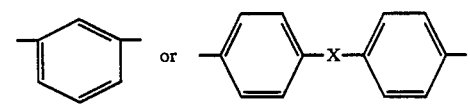

The following compounds include novel derivatives employed as raw materials respectively for preparing the above thermosetting resin composition.

That is, representative of such bismaleimide derivatives which are used includes
1,3-bis(3-maleimidephenoxy)benzene,
bis[4-(3-maleimide-phenoxy)phenyl]methane,
1,1 bis[4-(3-maleimide-phenoxy)phenyl]ethane, 1,2-bis4-(3-maleieidephenoxy)phenyl]ethane,
2,2-bis[4-(3-maleimidephenoxy)phenyl]propane,
2,2-bis[4-(3-maleimidephenoxy)phenyl]butane,
2,2-bis[4-(3-maleimidephenoxy)phenyl]-1,1,1,3,3,3-hexafluoropropane,
4,4'-bis(3-maleimidephenoxy)biphenyl,
bis[4-(3-maleimidephenoxy)phenyl]ketone,
bis[4-(3-maleimidephenoxy)phenyl]sulfide,
bis[4-(3-maleimidephenoxy)phenyl]sulfoxide
bis[4-(3-maleimidephenoxy)phenyl]sulfone,
bis[4-(3-maleimidephenoxy)phenyl]ether, etc.

These bismaleimide derivatives are used alone or in a combination of two and more.

The aforementioned novel bismaleimide derivatives can easily be prepared, usually according to conventional methods, by conducting a condensation and dehydration reaction of diamine derivatives having the following formula (III) with maleic anhydride.

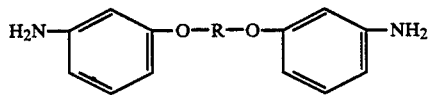
(III)

wherein R is a divalent radical represented by

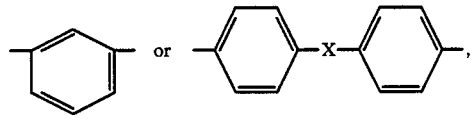

where X is a radical selected from the group consisting of a bond, a divalent hydrocarbon radical having 1 to 10 carbon atoms, hexafluorinated isopropylidene radical, carbonyl radical, thio radical, sulfinyl radical, sulfonyl radical, and oxide.

Novel diamine derivatives used include for example:
1,3-bis(3-aminophenoxy)benzene,
bis[4-(3-aminophenoxy)phenyl]methane,
1,1-bis[4-(3-aminophenoxy)phenyl]ethane,
1,2-bis[4-(3-aminophenoxy)phenyl]ethane,
2,2-bis[4-(3-aminophenoxy)phenyl]propane,
2,2-bis[4-(3-aminophenoxy)phenyl]butane,
2,2-bis[4-(3-aminophenoxy)phenyl]-1,1,1,3,3,3-hexafluoropropane,
4,4'-bis(3-aminophenoxy)biphenyl,
bis[4-(3-aminophenoxy)phenyl]ketone,
bis[4-(3-aminophenoxy)phenyl]sulfide,
bis4-(3-amino-phenox)phenyl]sulfoxide,
bis[4-(3-aminophenoxy)phenyl]sulfone,
bis[4-(3-aminophenoxy)phenyl]ether, etc.

These diamine derivatives are used alone or in a combination of two and more.

These diamine derivatives can be technically and advantageously prepared in a high purity and good yield by conducting a condensation reaction of respectively corresponding bisphenols with m-dinitrobenzene in aprotic polar solvents in the presence of bases and successively reducing the resultant intermediates (Japanese Patent Application Nos. 32568/1985, and 59560/1985).

The illustrative bismaleimide derivative wherein M is methylene in the above formula (I) includes bis(4-maleimidephenyl)methane. The compound can be easily prepared and applied, according to the usually known methods, by carrying out the condensation and dehydration reaction of bis(4-aminophenyl)methane and maleic anhydride.

The illustrative diamine derivative wherein N is methylene in the above formula (II) includes 4,4'-diaminodiphenylmethane. It is industrially and favorably produced from aniline and formaldehyde, and can be utilized for the present invention.

As the methods for preparing the thermosetting resin composition from the bismaleimide derivatives of the above formula (I) and the diamine derivatives of the above formula (II), various methods can be employed as illustrated in the following. (1) Bismaleimides and diamines are ground and mixed in the solid state, or the resultant mixture is heat-treated to form the prepolymer and then ground to give pellets or powder. As the heat-treatment conditions, it is suitable to proceed with partial curing to the stage of prepolymer. The heat-treatment is carried out generally at a temperature of 70° to 220° C. for 5 to 240 minutes, preferably at a temperature of 80° to 200° C. for 10 to 180 minutes. (2) Bismaleimides and diamines are dissolved in organic solvents and then poured into bad solvents, the precipitated crystals are filtered and dried to give pellets or powder. Otherwise, after dissolving into the organic solvents, bismaleimides and diamines are partially cured to the stage of prepolymer and then poured into the bad solvents. The precipitated crystals are filtered and dried to give the pellets or the powder. The conditions of these procedures are the same as in (1).

The organic solvents which can be used in this invention are restricted to those which are substantially unreactive to both components. The solvents are further desired to have good solubility to these reaction components.

Suitable solvents which can be normally used for the reaction include, for example, halogenated hydrocarbons such as chloroform, methylene chloride, dichloroethane and trichloroethylene; ketones such as acetone, methyl ethyl ketone, cyclohexanone and diisopropyl ketone; ethers such as tetrahydrofuran, dioxane and 2-methoxy ethanol; aromatic compounds such as benzene, toluene and chlorobenzene; and aprotic polar solvents such as acetonitrile, N,N-dimethylformamide, N,N-dimethylacetamide, dimethylsulfoxide, N-methyl-2-pyrrolidone and 1,3-dimethyl-2-imidazolidinone.

In addition, the composition comprising bismaleimides and diamines of this invention can be added with one or more of ordinary additives in the range wherein the object of this invention is unharmed. These additives include antioxidants, heat-stabilizers, ultra violet absorbers, flame retardants, antistatic agents, lubricants colorants and so on.

Furthermore other materials which can be incorporated in a suitable amount according to the object of addition include other thermosetting resins such as phenol resin, epoxy resin etc.; thermoplastic resins such as polyethylene, polypropylene, polyamide, polycarbonate, polysulfone, polyethersulfone, polyetheretherketone, modified polyphenyleneoxide, polyphenylenesulfide etc.; reinforcing materials such as glass fibre, carbon fibre, aromatic polyamide fiber, alumina fibre, potassium titanate fibre etc.; and fillers such as clay, mica, silica, graphite, glass beads, alumina, calcium carbonate, etc.

The bismaleimide derivatives of the formula (I) and the diamine derivatives of the formula (II) are preferably used in a proportion ranging from 10:1 to 1:1.2 molar ratio. When the proportion of the diamine derivatives employed is small, cured products cannot obtain a good impact strength and flexibility. On the other hand too much proportion of the diamine derivatives results in an adverse effect on the thermal stability of cured product.

The thermosetting resin compositions of this invention may be molded for practical use by known molding methods such as compression molding, transfer molding, extrusion molding, injection molding etc. and also applied to the raw materials for coating and adhesive, etc.

The thermosetting resins of this invention thus obtained are excellent in the thermal stability, impact strength and flexibility. Therefore they are expected for a wide use in such areas as electric and electronic parts, various structural members, self-lubricating components etc. Accordingly their application provides a remarkable effect on the industry.

DETAILED DESCRIPTION OF THE INVENTION

The present invention is described with reference to the following examples.

SYNTHESIS EXAMPLE 1

In a reaction flask equipped with a stirrer and a thermometer were charged 43.2 g (0.44 mole) of maleic anhydride and 130 g of acetone to prepare a solution. To the solution, a solution of 73.6 g (0.2 mole) of 4,4'-bis(3-aminophenoxy)biphenyl in 515 g of acetone was added dropwise at room temperature and the resulting solution was stirred at 23°–27° C. for 3 hours. After completion of the reaction, the crystals thus-formed were filtered, washed with acetone and dried to obtain bismaleamic acid in the form of yellowish crystals.

Amount: 110.6 g (Yield: 98.0%), m.p. 183°–185° C.

| | Elementary analysis (%): | | |
|---|---|---|---|
| | C | H | N |
| Calculated | 68.08 | 4.28 | 4.96 |
| Found | 68.51 | 4.06 | 5.06 |

IR (KBr, cm$^{-1}$): 1720 (carbonyl group, 1255 (ether linkage).

The bismaleamic acid thus-obtained (112 g) was suspended in 300 g of acetone, added with 9.6 g of triethylamine and then stirred at room temperature for 30 minutes.

After addition of 0.4 g of magnesium (II) oxide and 0.04 g of cobalt (II) acetate tetrahydrate, the resulting mixture was added with 52 0 g of acetic anhydride dropwise at 25° C. over 30 minutes and further stirred for 3 hours. After completion of the reaction, the crystals thus-formed were filtered, washed and dried to obtain 4,4'-bis(3-maleimidephenoxy)biphenyl as light yellowish crystals.

Amount: 84.5 g (Yield: 80.0%), m.p.: 207°–209° C.

| | Elementary analysis (%): | | |
|---|---|---|---|
| | C | H | N |
| Calculated | 72.72 | 3.81 | 5.30 |
| Found | 72.54 | 3.59 | 5.31 |

IR (KBr, cm$^{-1}$): 1720 and 1710 (imide linkage), 1250 (ether linkage).

MS (FD method, m/e): 528 (M+).

5% Weight decrease temperature (in air): 459° C.

SYNTHESIS EXAMPLE 2

In a reaction flask equipped with a stirrer and a thermometer were charged 10.8 g (0.11 mole) of maleic anhydride and 32 g of acetone to prepare a solution. To the solution, a solution of 20.5 g (0.05 mole) of 2,2 bis[4-(3-aminophenoxy)phenyl]propane in 41 g of acetone was added dropwise at room temperature and the resulting solution was stirred at 23°–27° C. for 3 hours. After completion of the reaction, the crystals thus-formed were filtered, washed with acetone and dried to obtain bismaleamic acid in the form of yellowish crystals.

Amount: 29.7 g (Yield: 98.0%), m.p.: 169°–171° C.

| | Elementary analysis (%): | | |
|---|---|---|---|
| | C | H | N |
| Calculated | 69.30 | 4.98 | 4.62 |
| Found | 69.19 | 4.73 | 4.59 |

IR (KBr, cm$^{-1}$): 3280 and 3220 (NH), 1700 (carboxyl group), 1580 and 1550 (amide linkage).

MS (FD method): m/e 608(M+2), 510, 491, 411.

The bismaleamic acid thus-obtained (38 g) was suspended in 92 g of acetone, added with 3 g of triethylamine and stirred at room temperature for 30 minutes.

After addition of 0.13 g of magnesium(II) oxide and 0.013 g of cobalt(II) acetate tetrahydrate, the resulting mixture was added with 16 g of acetic anhydride dropwise at 25° C. over 30 minutes and further stirred for 4 hours. After completion of the reaction, the crystals thus-formed were filtered, washed with methanol and dried at 40° C. under reduced pressure to obtain 2,2-bis[4-(3-maleimidphenoxy)phenyl]propane as light-yellowish crystals.

Amount: 30 g (Yield: 83.9%), m.p.: 161°–164° C.
Elementary analysis (%):

| | Elementary analysis (%): | | |
|---|---|---|---|
| | C | H | N |
| Calculated | 73.68 | 4.59 | 4.91 |
| Found | 74.14 | 4.27 | 4.84 |

IR (KBr, cm$^{-1}$): 1775 and 1715 (imide linkage), 1255 (ether linkage).

MS (FD method, m/e): 571 (M+1).

5% Weight decrease temperature (in air): 447° C.

SYNTHESIS EXAMPLE 3

In a reaction flask equipped with a stirrer and a thermometer were charged 37.8 g (0.385 mole) of maleic anhydride and 113 g of acetone to prepare a solution. To the solution, a solution of 70 g (0.175 mole) of bis[4-(3-aminophenoxy)phenyl]sulfide in 140 g of acetone was added dropwise at room temperature and further stirred at 25° C. for 3 hours. The crystals thus-formed were filtered, washed and dried to obtain bismaleamic acid in the form of light-yellowish crystals.

Amount: 104 g (Yield:99.6%), m.p.: 202–204° C.

| | Elementary analysis (%): | | | |
|---|---|---|---|---|
| | C | H | N | S |
| Calculated | 64.42 | 4.05 | 4.69 | 5.37 |

-continued

| | Elementary analysis (%): | | | |
|---|---|---|---|---|
| | C | H | N | S |
| Found | 64.35 | 3.94 | 4.61 | 5.25 |

IR (KBr, cm$^{-1}$): 3280 (NH), 1690 (carbonyl group), 1240 (ether linkage).

MS (FD method, m/e): 596, 400.

In a reaction flask equipped with a stirrer and a thermometer, 104 g of the bismaleamic acid thus-obtained was suspended in 300 g of acetone.

After addition of 8.4 g of triethylamine, the resulting mixture was stirred at 25° C. for 30 minutes.

After further addition of 0.35 g of magnesium (II) oxide and 0.035 g of cobalt(II) acetate tetrahydrate, the resultant mixture was added with 45.5 g of acetic anhydride dropwise and further stirred at 25° C. for 2 hours.

After completion of the reaction, the reaction liquid was fed dropwise into 1 liter of water with stirring. The crystals thus-formed were filtered, washed with water and dried to obtain bis[4-(3-maleimidephenoxy)phenyl]-sulfide as light-yellowish crystals.

Amount: 92 g (Yield: 93.8%).

The crystals were recrystallized from acetone to obtain a purified product.

m.p.: 64°-67° C.

| | Elementary analysis (%): | | | |
|---|---|---|---|---|
| | C | H | N | S |
| Calculated | 68.56 | 3.60 | 4.99 | 5.72 |
| Found | 68.48 | 3.53 | 4.80 | 5.95 |

IR (KBr, cm$^{-1}$): 1770 sh and 1730 (imide linkage), 1260 (ether linkage).

MS (FD method, m/e): 560.

5% Weight decrease temperature (in air): 434° C.

EXAMPLES 1-4

In a stainless steel vessel fitted with a stirrer, reflux condenser and nitrogen inlet tube, 4,4'-bis(3-maleimidephenoxy)biphenyl and 4,4'-bis(3-aminophenoxy)biphenyl were charged in the feed molar ratios given respectively in Table 1 and reacted at 180° C. for 20 minutes in a fused state. Thereafter, the reaction mixture was cooled to room temperature, and the reaction product thus-solidified in the state of a brown transparent glass was crushed, taken out of the vessel, ground in a mortar and screened through a 60-mesh sieve, thereby obtaining a partially-cured polyaminobismaleimide-type thermosetting resin composition.

The composition was filled in a mold (10×80×4 mm) which had been heated to 180° C. while being heated and molten and then compression-molded by keeping it at 200° C. for 30 minutes under a pressure of 50 kg/cm$^2$. Then, after being cooled to room temperature, the primary molded article was taken out of the mold and post-cured in a hot-air gear oven at 250° C. for 4 hours to obtain specimens for testing Izod impact strength and flexural strength. The Izod impact strength (unnotched) was measured in accordance with ASTM D-256 while flexural strength was determined according to ASTM D-790. Concurrently, 5% weight decrease temperature of the molded specimens was determined. The results given in Table 1 were obtained.

EXAMPLE 5

In a stainless steel vessel fitted with a stirrer, reflux condenser and nitrogen inlet tube, 4,4'-bis(3-maleimidephenoxy)biphenyl and 4,4'-bis(3-aminophenoxy)biphenyl were charged in the feed molar ratio given in Table 1. N-Methyl-2-pyrolidone was added to this mixture in such an amount that the resin concentration came to 55 wt.% so as to dissolve the both components. Then, reaction was carried out at 130° C. for 50 minutes under heating. The resultant brown transparent varnish was charged dropwise into water under stirring and the precipitate thus-came out was filtered, washed with water and dried with hot air at 80° C. for 15 hours. The precipitate was dried at 110° C. for 20 minutes and then at 130° C. for 20 minutes, ground in a mortar and screened through a 60-mesh sieve, thereby obtaining a partially-cured polyaminobismaleimide-type thermosetting resin composition.

Then, the procedure of Examples 1-4 was repeated to obtain the results given in Table 1. (The same sentence shall apply to the following Examples and Comparative Examples as final paragraph, although omitted in these Examples.)

EXAMPLES 6-20

Using the bismaleimides and diamines given in Table 1 in the feed molar ratios also given in Table 1, the procedure of Examples 1-4 was repeated to obtain the results shown in Table 1.

EXAMPLES 21-24

In a stainless steel vessel fitted with a stirrer, reflux condenser and nitrogen inlet tube, bis(4-maleamidephenyl)methane and 4,4'-bis(3-aminophenoxy)-biphenyl were charged in the feed molar ratios given respectively in Table 1 and reacted at 180° C. for 20 minutes in a fused state. Thereafter, the resulting mixture was cooled to room temperature, and the reaction product thus-solidified in the form of a brown transparent glass was crushed, taken out of the vessel, ground in a mortar and screened through a 60-mesh sieve, thereby obtaining a partially-cured polyaminobismaleimide-type thermosetting resin composition.

EXAMPLE 25

In a stainless steel vessel fitted with a stirrer, reflux condenser and nitrogen inlet tube, bis(4-maleimidephenyl)methane and 4,4'-bis(3-aminophenoxy)biphenyl were charged in the feed molar ratio given in Table 1. N-Methyl-2-pyrolidone was added to this mixture in such an amount that the resin concentration came to 55 wt.% so as to dissolve the both components. Then, reaction was carried out at 130° C. for 50 minutes under heating. The resultant brown transparent varnish was charged dropwise into water under stirring and the precipitate thus-came out was filtered, washed with water and dried with hot air at 80° C. for 15 hours. The precipitate was dried at 110° C. for 20 minutes and then at 130° C. for 20 minutes, ground in a mortar and screened through a 60-mesh sieve, thereby obtaining a partially-cured polyaminobismaleimide-type thermosetting resin composition.

EXAMPLES 26-28

Using the bismaleimide and diamines given in Table 1 in the feeding molar ratio also given in Table 1, the procedure of Examples 1-4 was repeated to obtain the results shown in Table 1.

EXAMPLES 29-32

In a stainless steel vessel fitted with a stirrer, reflux condenser and nitrogen inlet tube, 4,4'-bis(3-maleimidephenoxy)biphenyl and bis(4-aminophenoxy)methane were charged in the feed molar ratios given respectively in Table 1 and reacted at 180° C. for 20 minutes in a fused state. Then, the resulting mixture was cooled to room temperature, and the reaction product thus-solidified in the form of a brown transparent glass was crushed, taken out of the vessel, ground in a mortar and screened through a 60-mesh sieve, thereby obtaining a partially-cured polyaminobismaleimide-type thermosetting resin composition.

EXAMPLE 33

In a stainless steel vessel fitted with a stirrer, reflux condenser and nitrogen inlet tube, 4,4'-bis(3-maleimidephenoxy)biphenyl and bis(4-aminophenoxy)methane were charged in the feed molar ratio given in Table 1. N-Methyl-2-pyrolidone was added to this mixture in such an amount that the resin concentration came to 55 wt.% so as to dissolve the both components. Then, reaction was carried out at 130° C. for 50 minutes under heating. The resultant brown transparent varnish was charged dropwise into water under stirring and the precipitate thus-came out was filtered, washed with water and dried with hot air at 80° C. for 15 hours. The precipitate was dried at 110° C. for 20 minutes and then at 130° C. for 20 minutes, ground in a mortar and screened through a 60-mesh sieve, thereby obtaining a partially-cured polyaminobismaleimide-type thermosetting resin composition.

EXAMPLES 34-36

Using the bismaleimides and diamine given in Table 1 in the feed molar ratio also given in Table 1, the procedure of Examples 1-4 was repeated to obtain the results shown in Table 1.

COMPARATIVE EXAMPLES 1-2

Using the bismaleimide and diamine given in Table 1 in the feed molar ratios also given in Table 1, the procedure of Examples 1-4 was repeated to obtain the results shown in Table 1.

As is obvious from the results shown in Table 1, the thermosetting resin composition according to the present invention is excellent in flexural strength and modulus of flexural elasticity as well as Izod impact value. Therefore, the composition is a material having an outstanding impact resistance and flexibility. The composition is also excellent in high-temperature stability as indicated by 5% weight decrease temperature of not less than 390° C.

TABLE 1

| | Bismaleimide (B) | Diamine (A) | Feed Molar Ratio (B/A) | Izod Impact Strength (unnotched) (kg·cm/cm) | Flexural Strength (kg/cm$^2$) | Modulus of Flexural Elasticity (kg/cm$^2$) | 5% Weight Decrease Temperature (°C.) |
|---|---|---|---|---|---|---|---|
| Example 1 | 4,4'-bis(3-maleimidephenoxy)biphenyl | 4,4'-bis(3-aminophenoxy)biphenyl | 8.0/1.0 | 20 | 990 | 35,100 | 417 |
| Example 2 | 4,4'-bis(3-maleimidephenoxy)biphenyl | 4,4'-bis(3-aminophenoxy)biphenyl | 5.0/1.0 | 21 | 1,020 | 34,800 | 412 |
| Example 3 | 4,4'-bis(3-maleimidephenoxy)biphenyl | 4,4'-bis(3-aminophenoxy)biphenyl | 2.0/1.0 | 23 | 1,180 | 34,500 | 409 |
| Example 4 | 4,4'-bis(3-maleimidephenoxy)biphenyl | 4,4'-bis(3-aminophenoxy)biphenyl | 1.0/1.0 | 21 | 1,210 | 34,500 | 406 |
| Example 5 | 4,4'-bis(3-maleimidephenoxy)biphenyl | 4,4'-bis(3-aminophenoxy)biphenyl | 2.0/1.0 | 22 | 1,160 | 34,500 | 408 |
| Example 6 | 4,4'-bis(3-maleimidephenoxy)biphenyl | 1,3-bis(3-aminophenoxy)benzene | " | 16 | 1,120 | 36,300 | 399 |
| Example 7 | 4,4'-bis(3-maleimidephenoxy)biphenyl | 2,2-bis[4-(3-aminophenoxyphenyl]propane | " | 19 | 1,040 | 35,600 | 402 |
| Example 8 | 4,4'-bis(3-maleimidephenoxy)biphenyl | bis[4-(3-aminophenoxyphenyl]sulfide | " | 19 | 990 | 35,700 | 411 |
| Example 9 | 1,3-bis(3-maleimidephenoxy)benzene | 4,4'-bis(3-aminophenoxy)biphenyl | " | 15 | 1,370 | 35,500 | 396 |
| Example 10 | 1,3-bis(3-maleimidephenoxy)benzene | 1,3-bis(3-aminophenoxy)benzene | " | 15 | 1,290 | 34,200 | 398 |
| Example 11 | 1,3-bis(3-maleimidephenoxy)benzene | 2,2-bis[4-(3-aminophenoxy)phenyl]propane | 2.0/1.0 | 12 | 1,200 | 36,100 | 392 |
| Example 12 | 1,3-bis(3-maleimidephenoxy)benzene | bis[4-(3-aminophenoxy)phenyl]sulfide | " | 13 | 980 | 35,700 | 392 |
| Example 13 | 2,2-bis[4-(3-maleimidephenoxy)phenyl]propane | 4,4'-bis(3-aminophenoxy)biphenyl | " | 12 | 1,330 | 34,200 | 394 |
| Example 14 | 2,2-bis[4-(3-maleimidephenoxy)phenyl]propane | 1,3-bis(3-aminophenoxy)benzene | " | 12 | 1,400 | 36,100 | 395 |
| Example 15 | 2,2-bis[4-(3-maleimidephenoxy)phenyl]propane | 2,2-bis[4-(3-aminophenoxy)phenyl]propane | 2.0/1.0 | 12 | 1,420 | 36,300 | 396 |
| Example 16 | 2,2-bis[4-(3-maleimidephenoxy)phenyl]propane | bis[4-(3-aminophenoxy)phenyl]sulfide | " | 12 | 990 | 34,600 | 405 |
| Example 17 | bis[4-(3-maleimidephenoxy)phenyl]sulfide | 4,4'-bis(3-aminophenoxy)biphenyl | " | 22 | 1,370 | 35,300 | 395 |
| Example 18 | bis[4-(3-maleimidephenoxy)phenyl]sulfide | 1,3-bis(3-aminophenoxy)benzene | " | 12 | 1,290 | 34,400 | 396 |
| Example 19 | bis[4-(3-maleimidephenoxy)phenyl]sulfide | 2,2-bis[4-(3-aminophenoxy)phenyl]propane | " | 12 | 1,200 | 36,200 | 403 |
| Example 20 | bis[4-(3-maleimidephenoxy)phenyl]sulfide | bis[4-(3-aminophenoxy)phenyl]sulfide | " | 14 | 990 | 35,600 | 417 |
| Example 21 | bis(4-maleimidephenyl)methane | 4,4'-bis(3-aminophenoxy)biphenyl | 8.0/1.0 | 13 | 960 | 36,000 | 415 |
| Example 22 | bis(4-maleimidephenyl)- | 4,4'-bis(3-aminophenoxy)- | 5.0/1.0 | 16 | 980 | 35,400 | 413 |

TABLE 1-continued

| | Bismaleimide (B) | Diamine (A) | Feed Molar Ratio (B/A) | Izod Impact Strength (unnotched) (kg · cm/cm) | Flexural Strength (kg/cm²) | Modulus of Flexural Elasticity (kg/cm²) | 5% Weight Decrease Temperature (°C.) |
|---|---|---|---|---|---|---|---|
| Example 22 | bis(4-maleimidephenyl)-methane | biphenyl | | | | | |
| Example 23 | bis(4-maleimidephenyl)-methane | 4,4'-bis(3-aminophenoxy)-biphenyl | 2.0/1.0 | 18 | 1,120 | 34,800 | 412 |
| Example 24 | bis(4-maleimidephenyl)-methane | 4,4'-bis(3-aminophenoxy)-biphenyl | 1.0/1.0 | 14 | 990 | 34,600 | 392 |
| Example 25 | bis(4-maleimidephenyl)-methane | 4,4'-bis(3-aminophenoxy)-biphenyl | 2.0/1.0 | 16 | 1,080 | 34,800 | 411 |
| Example 26 | bis(4-maleimidephenyl)-methane | 1,3-bis(3-aminophenoxy)-benzene | 2.0/1.0 | 15 | 1,200 | 35,200 | 399 |
| Example 27 | bis(4-maleimidephenyl)-methane | 2,2-bis[4-(3-aminophenoxy)phenyl]propane | 2.0/1.0 | 13 | 1,250 | 35,000 | 405 |
| Example 28 | bis(4-maleimidephenyl)-methane | bis[4-(3-aminophenoxy)phenyl]sulfide | 2.0/1.0 | 14 | 1,110 | 34,900 | 402 |
| Example 29 | 4,4'-bis(3-maleimidephenoxy)-biphenyl | bis(4-aminophenyl)-methane | 8.0/1.0 | 13 | 980 | 37,100 | 421 |
| Example 30 | 4,4'-bis(3-maleimidephenoxy)-biphenyl | bis(4-aminophenyl)-methane | 5.0/1.0 | 14 | 1,020 | 36,200 | 418 |
| Example 31 | 4,4'-bis(3-maleimidephenoxy)-biphenyl | bis(4-aminophenyl)-methane | 2.0/1.0 | 16 | 1,160 | 34,800 | 416 |
| Example 32 | 4,4'-bis(3-maleimidephenoxy)-biphenyl | bis(4-aminophenyl)-methane | 1.0/1.0 | 13 | 1,000 | 34,200 | 402 |
| Example 33 | 4,4'-bis(3-maleimidephenoxy)-biphenyl | bis(4-aminophenyl)-methane | 2.0/1.0 | 15 | 1,130 | 35,200 | 418 |
| Example 34 | 1,3-bis(3-maleimidephenoxy)-benzene | bis(4-aminophenyl)-methane | 2.0/1.0 | 14 | 1,210 | 34,600 | 416 |
| Example 35 | 2,2-bis[4-(3-maleimidephenoxy)-phenyl]propane | bis(4-aminophenyl)-methane | 2.0/1.0 | 13 | 990 | 35,800 | 407 |
| Example 36 | bis[4-(3-maleimidephenoxy)-phenyl]sulfide | bis(4-aminophenyl)-methane | 2.0/1.0 | 14 | 990 | 34,900 | 405 |
| Comparative Example 1 | bis(4-maleimidephenoxy)-methane | bis(4-aminophenyl)-methane | 2.0/1.0 | 11 | 920 | 37,200 | 393 |
| Comparative Example 2 | bis(4-maleimidephenoxy)-methane | bis(4-aminophenyl)-methane | 1.0/0 | 4 | 710 | 52,600 | 418 |

We claim:

1. A thermosetting resin composition which comprises:
   (a) a bismaleimide derivative having the formula (III):

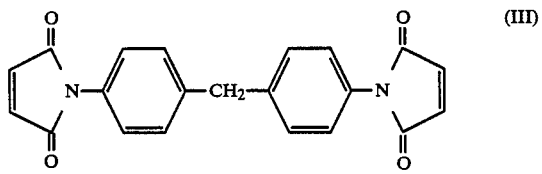

(b) a diamine derivative having the formula (IV):

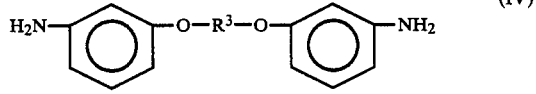

wherein R³ is a divalent radical represented by

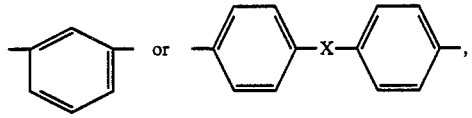

wherein X is a bond, or X is a radical selected from the group consisting of a hexafluorinated isopropylidene radical, a carbonyl radical, a thio radical, and a sulfinyl radical.

2. The thermosetting resin composition of claim 1 wherein the bismaleimide derivative (III) and the diamine derivative (IV) are used in a proportion ranging from 10:1 to 1:1.2 molar ratio.

3. A thermosetting resin prepolymer obtained by conducting heat-treatment of the thermosetting resin composition at a temperature of 70° to 220° C. in the presence or absence of a solvent, said thermosetting resin composition comprising:
   (a) a bismaleimide derivative having the formula (III):

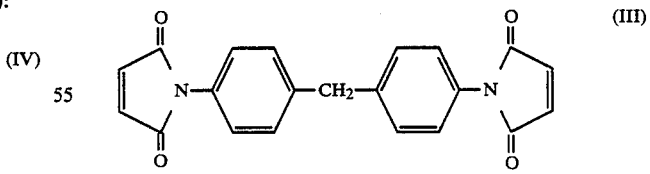

and
   (b) a diamine derivative having the formula (IV):

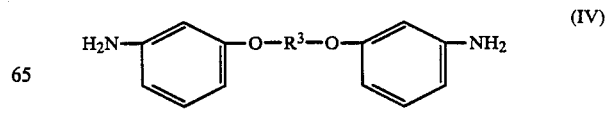

wherein R³ is a divalent radical represented by

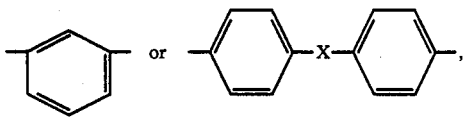
wherein X is a bond, or X is a radical selected from the group consisting of a hexafluorinated isopropylidene radical, a carbonyl radical, a thio radical, and a sulfinyl radical.
* * * * *
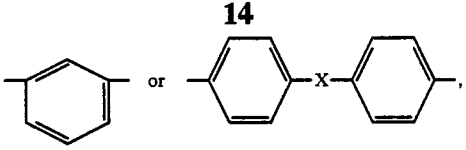
wherein X is a bond, or X is a radical selected from the group consisting of a hexafluorinated isopropylidene radical, a carbonyl radical, a thio radical, and a sulfinyl radical.
* * * * *